May 9, 1961          A. R. SPICACCI          2,983,030

METHOD OF MANUFACTURING BEARING RACES

Filed Nov. 27, 1957          2 Sheets-Sheet 1

INVENTOR
ATTILIO R. SPICACCI

BY *Robert K. Yautis*

ATTORNEY

May 9, 1961 A. R. SPICACCI 2,983,030
METHOD OF MANUFACTURING BEARING RACES
Filed Nov. 27, 1957 2 Sheets-Sheet 2
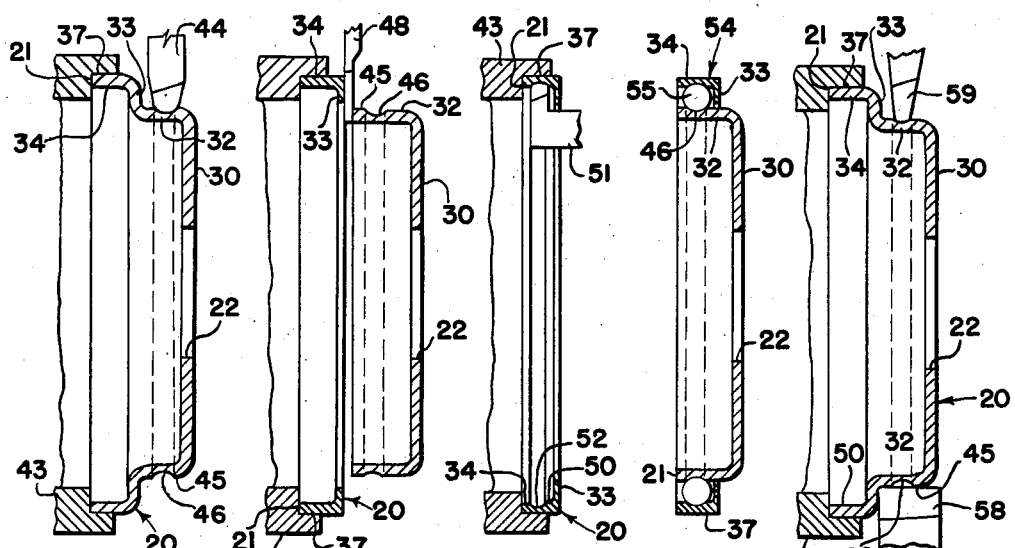
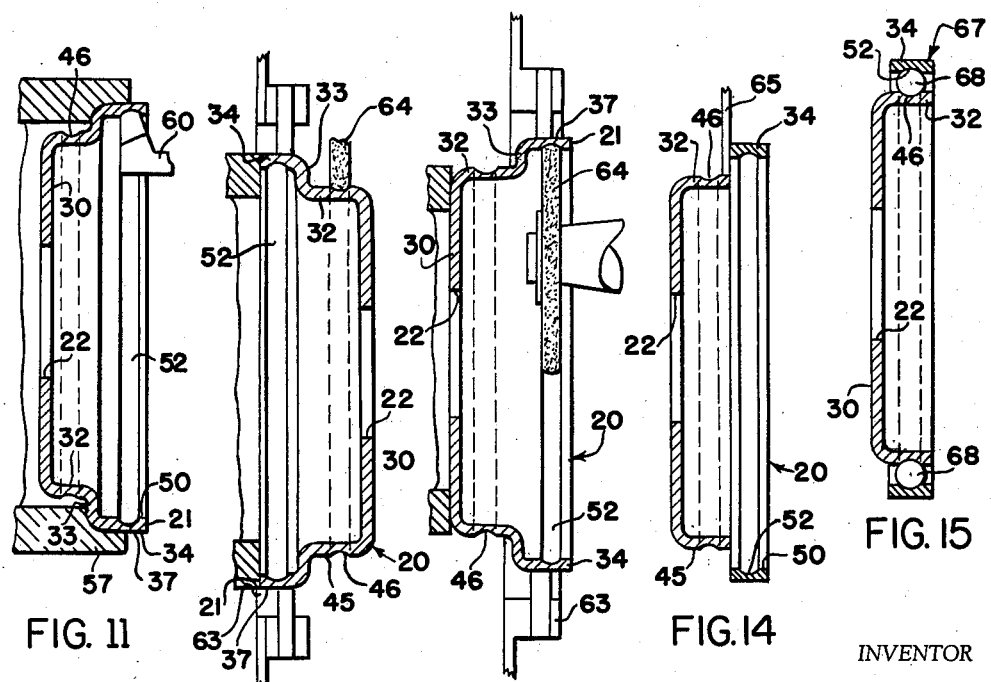
INVENTOR
ATTILIO R. SPICACCI
BY Robert K. Youtie
ATTORNEY

United States Patent Office 2,983,030
Patented May 9, 1961

2,983,030
METHOD OF MANUFACTURING BEARING RACES

Attilio R. Spicacci, 1616 Ridgeview Ave., Lancaster, Pa.

Filed Nov. 27, 1957, Ser. No. 699,291

7 Claims. (Cl. 29—148.4)

This invention relates generally to new and useful improvements in the manufacture of bearings, and is especially concerned with improvements in the manufacture of races for rolling bearings.

While the instant method has been primarily developed for use in the manufacture of ball bearings, and will be illustrated and described hereinafter with particular reference thereto, it is appreciated that the subject method is capable of application in the manufacture of many types of rolling bearings, all of which are intended to be comprehended herein.

As is well known to those versed in the art, ball-bearing races or rings are now manufactured separately and subsequently assembled, by any of several well-known methods, together with the rolling bearing elements. In addition to the difficulty in maintaining precision of the rings or races when machined separately, the separate hardening of the rings, by reason of their usually small cross section, introduces a relatively high amount of distortion, often requiring considerable further machining. Obviously, such manufacturing procedures are relatively costly, both in the way of rejects, and by reason of the many handling and machining operations required on the separate rings.

It is therefore one object of the present invention to provide a method of manufacturing bearing rings or races which substantially reduces the number of machining operations, as well as the setup time of the required machining operations, to effect substantial reduction in manufacturing costs.

It is another object of the present invention to provide a method of manufacturing bearing rings or races wherein considerably less distortion to the rings or races is caused by the hardening procedure, thereby insuring greater accuracy with less machining.

It is a more particular object of the present invention to provide a method of manufacturing both the inner and outer bearing rings or races from a single piece of stock, so that it is only necessary to perform operations on the single piece of stock, which is subsequently severed to form inner and outer rings having an extremely high degree of concentricity and squareness.

In the instant description and appended claims it is understood that the terms "machining" and "finishing" are used in the broad sense of subjecting material to the operation of machinery, such as to include grinding and other metal-working processes.

Other objects of the present invention will become apparent upon reading the following specification and referring to the accompanying drawings, which form a material part of this disclosure.

The invention accordingly consists in the combinations and arrangements of method steps which will be exemplified in the following description, and of which the scope will be indicated by the appended claims.

In the drawings:

Figure 6 is a diametral sectional view illustrating a turning operation of the present invention;

Figure 7 is a diametral sectional view illustrating a severing operation of the present invention;

Figure 8 is a diametral sectional view illustrating an additional turning operation of the present invention;

Figure 9 is a diametral sectional view illustrating an assembled bearing formed in accordance with the steps of the present invention;

Figures 10–14 are diametral sectional views illustrating a series of machining operations in accordance with a slightly modified embodiment of the present invention; and Figure 15 is a diametral sectional view showing an assembled bearing resulting from the steps of Figures 10–14.

Figure 1:
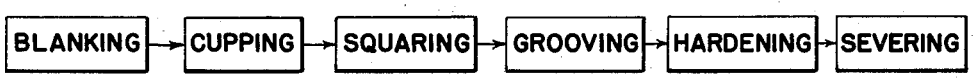
Figure 1 is a schematic flow diagram illustrating a method of manufacturing bearing races according to the present invention.

Referring now more particularly to the drawings, and specifically to Figures 1–10 thereof, wherein are shown for purposes of illustration and without limiting intent, one embodiment of the present invention, which generally includes the steps shown in the flow diagram of Figure 1, which may be amplified as follows:

(1) Blanking—forming a flat blank;

(2) Cupping—forming the flat blank to a cup-shaped shell;

(3) Squaring—machining external surfaces of the cupped blank to square the surfaces;

(4) Grooving—forming internal and external annular surfaces of the cupped member for engagement with rolling bearing elements, as by grooving for ball elements;

(5) Hardening—subjecting the grooved cup-shaped element to a hardening procedure, as by heat treating; and (6) Severing—cutting or otherwise separating annular parts of the cupped member to form the separate races.

Figure 2:
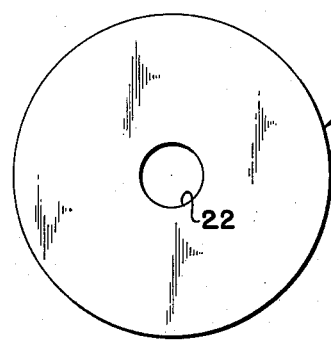
Figure 2 is a plan view showing a blank adapted for use in the instant method.

More specifically, Figure 2 illustrates a blank, generally designated 20, which may be stamped of sheet material having a generally circular external configuration defined by the peripheral edge 21, and preferably provided with a concentric, circular, central pilot hole or locating aperture 22.

Figure 3:
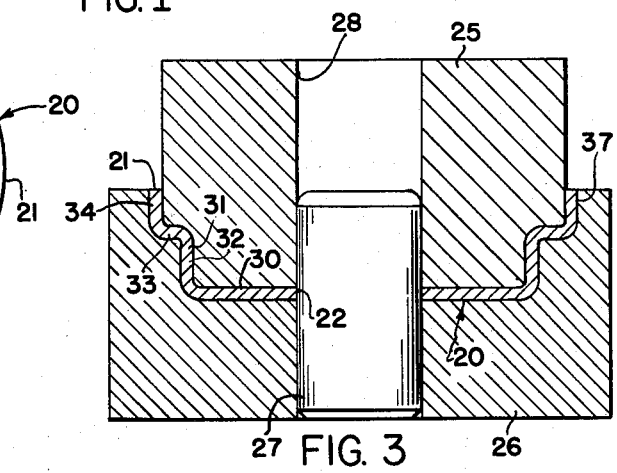
Figure 3 is a diametral sectional view showing an operation upon the blank of Figure 1.

In Figure 3 is illustrated the blank 20 being subjected to the action of male and female drawing dies 25 and 26, respectively. It is there seen that the female die 26 may be provided with a central locating pin 27 which extends through the aperture 22 of the element being worked, and into a central bore 28 of the male die 25. The complementary die surfaces are contoured to draw the work 20 into a generally cup-shaped configuration having a generally circular bottom or end wall 30 and an annular side wall 31 extending about the periphery of the end wall and generally normal thereto.

More particularly, the annular peripheral or side wall 31 includes a generally cylindrical or annular wall portion 32 extending from the periphery of bottom wall 30 substantially normal thereto and concentric with the central aperture 22. Extending radially outward from the cylindrical wall portion 32, at its region remote from the bottom wall 30 and substantially normal to the cylindrical wall portion 32 is an annular, offsetting wall portion 33. A second annular, cylindrical wall portion 34 extends from the outer or peripheral region of the radially extending wall portion 33 substantially normal thereto in the direction away from the cylindrical wall portion 32. More specifically, the cylindrical wall portion 34 is concentric with and of a diameter greater than that of the cylindrical wall portion 32 so as to be spaced at all points radially outward from the latter. In addition, the cylindrical wall portion 34 of larger diameter and the cylindrical wall portion 32 of smaller diameter extend normal to and in opposite directions from the intermediate or connecting annular wall portion 33, so that the wall portions 32, 33, and 34 combine to define a peripheral side wall 31 of stepped configuration. It will also be noted in Figure 3 that the larger-diameter cylindrical wall portion 34 terminates remote from the connecting wall portion 33 in the circular edge 21 now disposed in a plane substantially parallel to that of the bottom wall 30 and defining the rim of the cup-shaped member 20.

Figures 4, 5:
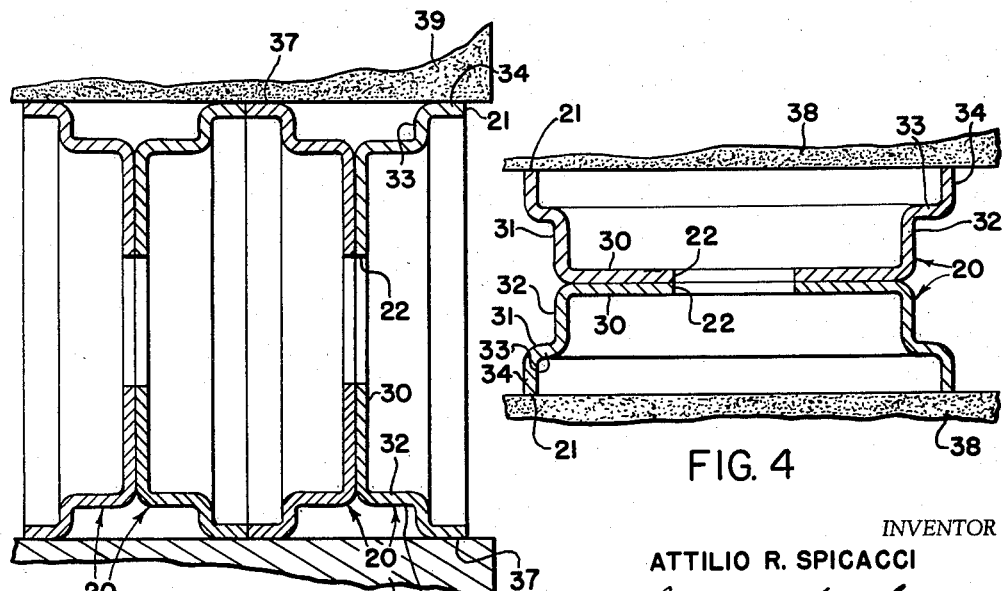
Figure 4 is a diametral sectional view illustrating a squaring operation of the present invention.
Figure 5 is a diametral sectional view illustrating another squaring operation of the present invention.

It is next desirable to square the rim edge 21 of the cup-shaped member 20 relative to the external surface 37 of the larger-diameter cylindrical wall portion 34. One manner in which this may be accomplished is illustrated in Figures 4 and 5. In the former figure are illustrated a pair of the drawn cup-shaped elements 20 arranged in back-to-back relation with their bottom walls 30 in facing engagement with each other and their annular, peripheral side walls extending away from each other. Thus arranged, the pair of cup-shaped elements 20 are set between the discs 38 of a double-disc grinder with their rim edges 21 respectively engaging the grinding discs. Obviously, this procedure will make the rim edges 21 each accurately coplanar and disposed in parallelism with each other.

The edge-ground cup-shaped members 20 may then be passed in their back-to-back relation through a centerless grinder, see Figure 5 wherein are illustrated the grinding wheel 39 and regulating wheel 40 of a centerless grinder. By this operation the external surfaces 37 of the larger diameter cylindrical wall portions 34 are accurately cylindrically finished and accurately normal or square with respect to the previously finished rim edges 21.

As illustrated in Figure 5 successive back-to-back pairs of the cupped members 20 may be passed through the centerless grinder 39, 40 with the finished rim edges 21 of adjacent pairs in engagement with each other. While this effectively speeds production, it is of course appreciated that the cup-shaped members may be ground individually, if desired, in either or both of the operations of Figures 4 and 5.

In Figure 6 one of the previously squared cupped elements 20 is illustrated as mounted in a chuck 43 for a turning operation. In particular, the cupped element 20 of Figure 6 is mounted in the chuck 43 on its squared surfaces 21 and 37; and, a cutting tool 44 is moved into cutting engagement with the external surface 45 of the smaller diameter cylindrical wall portion 32 to finish the latter, as by cutting a ball-receiving groove 46. Thus, the outer surface 45 of the smaller diameter cylindrical wall portion 32 is machined or finished for engagement with rolling bearing elements.

With the cupped member 20 remaining in the chuck 43 in Figure 7, a parting tool 48 is moved radially inward into cutting engagement with the radially extending wall portion 33 to sever the latter from the adjacent portion of the smaller-diameter cylindrical wall portion 32. Further, in the illustrated embodiment, the parting tool is moved radially inward so as to leave a part of the radially extending wall portion 33 connected to and extending radially inward from the larger-diameter cylindrical wall portion 34, while severing the radially extending wall portion from the smaller-diameter cylindrical wall portion. Figure 7 illustrates the just-completed severance of the cylindrical wall portions.

In Figure 8 is illustrated the larger-diameter annular wall portion 34 still remaining in the chuck 43 and having its internal surface 50 being machined or finished, as by a boring tool 51 turning a groove 52 for receiving spherical bearing elements.

Thus, subsequent to the squaring operation of Figures 4 and 5, the cupped element 20 has had the external surface of the smaller-diameter cylindrical wall portion and the internal surface of its larger-diameter cylindrical wall portion finished for engagement with rolling bearing elements, all in one chucking to insure maximum accuracy and concentricity of the separated cylindrical wall portions 32 and 34.

Of course, the internal finishing operation of Figure 8 may be performed before the severing operation of Figure 7, if desired, and the thus-finished work 20 may be hardened all in one piece to reduce possible distortion to a minimum. Necessary finishing operations may be performed after hardening, and the smaller and larger cylindrical wall portions severed, as by a cutoff tool in Figure 7, ready for assembly of the completed bearing.

Such a completed bearing is illustrated in Figure 9, and there generally designated 54, wherein the smaller-diameter cylindrical wall portion 32 defines the inner race, and the larger-diameter cylindrical wall portion 34 defines the outer race, with spherical rolling bearing elements 55 interposed between the races and the remaining portion of radially extending wall 33 defines a dust cover protectively enclosing the spherical elements.

A slightly modified form of the present invention is illustrated in Figures 10-15, in combination with previously described Figures 1-5. A cupped element 20 having its rim edge 21 and the external surface 37 of the larger-diameter cylindrical wall portion 34 ground square, may be mounted in a chuck 57 on its ground surfaces. The external surface of the smaller-diameter cylindrical wall portion 32 may then be turned, as by a cutting tool 58, into accurate concentricity with the external ground surface 37 of the larger-diameter cylindrical wall portion 34. Either simultaneously or otherwise, the external surface 45 of the smaller-diameter cylindrical wall portion 32 may be grooved, as by a cutting tool 59 in Figure 10.

The work 20 may then be reversed in the chuck 57, as in Figure 11, wherein the work is again chucked on its ground cylindrical surface 37, but the smaller-diameter cylindrical wall portion 32 is located inward of the larger-diameter cylindrical wall portion 34 relative to the chuck. This more readily exposes the internal surface 50 of the larger-diameter cylindrical wall portion 34 for turning or grooving, as by a tool 60 cutting an internal groove 52 for receiving rolling bearing elements. As the work 20 is chucked on its ground external surface 37 in both operations of Figures 10 and 11, it will be understood that the finishing operations on the surfaces 45 and 50 will be of maximum concentricity. Of course, the operations of Figures 10 and 11 may be reversed in sequence, if desired; and, it may under certain conditions be possible to machine the internal surface 50 of larger-diameter cylindrical wall portion 34 when the work 20 is chucked as in Figure 10, thereby eliminating one chucking.

Subsequent to the finishing operations of Figures 10 and 11, the unitary, one-piece work 20 is preferably hardened by any suitable process, such as heat treating.

Subsequent to hardening, the one-piece work 20 may be finished ground, as in Figure 12, where the work is held in the diaphragm chuck 62 of a grinding machine 63, and a grinding wheel 64 finishes the groove 46 of the smaller-diameter cylindrical wall portion 45. The internal groove 52 of the larger-diameter cylindrical wall portion 34 may also be finished ground in the chucking of Figure 12.

However, Figure 13 illustrates the work 20 reversed in the diaphragm chuck 63 to better expose the internal groove 52 of the larger-diameter cylindrical wall portion 34 for finished grinding.

Figure 14 illustrates the finished-ground work of Figures 10-13 being subjected to the severing action of a cutoff tool 65. In the severing operation of Figure 14 it will be noted that the cut-off tool 65 has entirely removed the radially extending wall portion 33 previously connecting the smaller- and larger-diameter cylindrical wall portions 32 and 34 to sever the latter. This severing procedure may be optionally employed when it is desired to provide no dust cover on the resultant bearing.

The assembled bearing resulting from the operations of Figures 1–4 and 10–14 is illustrated at 67 in Figure 15, wherein the larger-diameter cylindrical wall portion 34 defines the outer race and the smaller-diameter cylindrical wall portion 32 defines the inner race, between which races are assembled spherical rolling bearing elements 68 engaged in the grooves 52 and 46.

From the foregoing, it is seen that the present invention provides a method of manufacturing bearing rings or races which fully accomplishes its intended objects, and is well adapted to meet practical factory conditions.

Although the present invention has been described in some detail by way of illustration and example for purposes of clarity of understanding, it is understood that certain changes and modifications may be made within the spirit of the invention and scope of the appended claims. By way of example, while the initial shell 20 has been illustrated as formed from a stamping, and including a bottom wall 30, it is fully appreciated that the initial shell may be forged, machined, or otherwise formed, and need not include a bottom wall, it being only essential that the annular member 31 include generally concentric radially spaced annular wall portions 32 and 34. Also, it is understood that although several variants of the instant method have been mentioned hereinbefore, many additional variants, such as changes in the sequence of steps and the like, may be obvious to persons skilled in the art, and are within the contemplation of the instant invention.

What is claimed is:

1. In the method of manufacturing relatively thin bearing races, the steps which comprise: providing a generally cup-shaped annular integral member having generally concentric radially and axially spaced annular wall portions, chucking said member in a metal-working machine, machining the external surface of the smaller annular wall portion of said integral member into final shape for engagement with rolling bearing elements while said member is chucked, machining the internal surface of the larger annular wall portion of said integral member into final shape for engagement with rolling bearing elements while said member is chucked, and subsequently separating said annular wall portions, said separated annular wall portions thus being adapted for assembly together with rolling bearing elements to define a bearing.

2. The method according to claim 1, further characterized by hardening said annular member before separation of said wall portions, thereby minimizing distortion of said wall portions during hardening.

3. In the method of manufacturing bearing races, the steps which comprise: forming a cupped shell having a stepped peripheral side wall defining concentric radially spaced cylindrical wall portions, machining the rim end surface of said shell and the external surface of the larger of said cylindrical wall portions to square said surfaces with respect to each other, chucking said shell on said squared surfaces, completely machining the external surface of the smaller of said cylindrical wall portions into final shape for engagement with rolling bearing elements with said shell chucked on said squared surfaces, completely machining the internal surface of the larger of said cylindrical wall portions into final shape for engagement with rolling bearing elements with said shell chucked on said squared surfaces, and separating said cylindrical wall portions, said subsequently separated cylindrical wall portions thus being adapted for assembly together with rolling bearing elements to define a bearing.

4. The method according to claim 3, further characterized by hardening said annular member before separation of said cylindrical wall portions, thereby minimizing distortion of said cylindrical wall portions due to hardening.

5. In the method of manufacturing relatively thin bearing races, the steps which comprise: providing a generally annular member having generally concentric radially spaced cylindrical wall portions and a radially extending annular wall portion connecting said cylindrical wall portions, chucking said member on a metal-working machine, completely finishing the external surface of the smaller of said cylindrical wall portions into final shape for engagement with rolling bearing elements while said member is chucked, completely finishing the internal surface of the larger of said annular wall portions into final shape for engagement with rolling bearing elements while said member is chucked, hardening said annular member and subsequently severing said radially extending wall portion from at least one of said cylindrical wall portions to separate said cylindrical wall portions, said separated cylindrical wall portions thus being adapted for assembly together with rolling bearing elements to define a bearing.

6. The method according to claim 5, wherein said radially extending wall portion is severed by its entire removal from both of said cylindrical wall portions.

7. The method according to claim 5, wherein said radially extending wall portion is severed by removing only a portion thereof, the remaining portion of said radially extending wall portion serving as a bearing-element cover.

References Cited in the file of this patent

UNITED STATES PATENTS

| | | |
|---|---|---|
| 895,992 | Eveland | Aug. 11, 1908 |
| 1,387,638 | Bingham | Aug. 16, 1921 |
| 1,854,897 | Ganster | Apr. 19, 1932 |
| 2,145,864 | Deneen | Feb. 7, 1939 |
| 2,488,848 | Carullo | Nov. 22, 1949 |